J. F. NEWSOM.
ELECTRICALLY HEATED COOKING DEVICE.
APPLICATION FILED SEPT. 20, 1921.

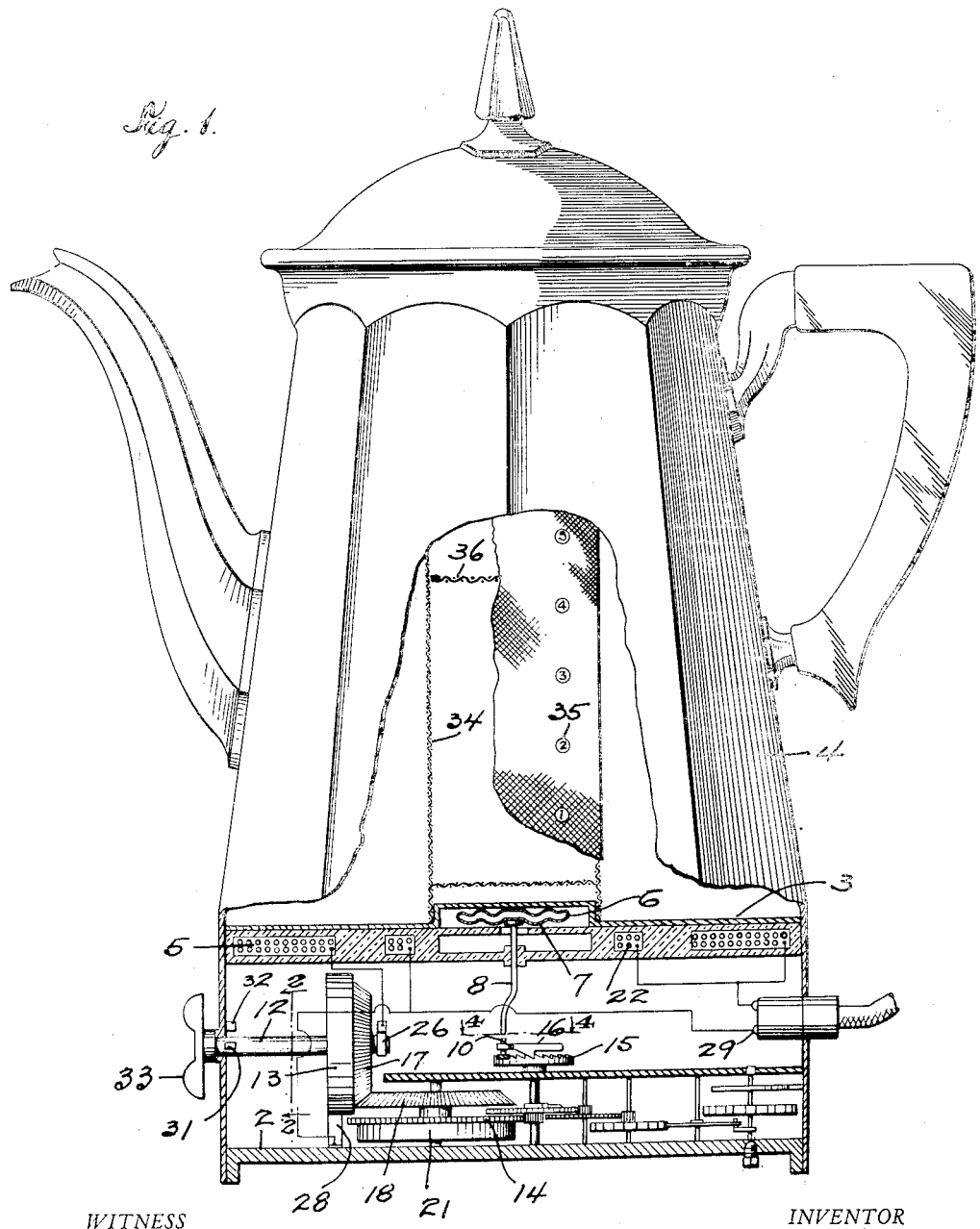

1,437,005.

Patented Nov. 28, 1922.
2 SHEETS—SHEET 2.

WITNESS
H. Sherburne

INVENTOR
John F. Newsom
BY
White Prost Evans
his ATTORNEYS

Patented Nov. 28, 1922.

1,437,005

UNITED STATES PATENT OFFICE.

JOHN F. NEWSOM, OF PALO ALTO, CALIFORNIA.

ELECTRICALLY-HEATED COOKING DEVICE.

Application filed September 20, 1921. Serial No. 502,008.

*To all whom it may concern:*

Be it known that I, JOHN F. NEWSOM, a citizen of the United States, and a resident of Palo Alto, county of Santa Clara, and State of California, have invented a certain new and useful Electrically-Heated Cooking Device, of which the following is a specification.

The invention relates to an electrically heated cooking device and particularly to automatically controlled device of this character.

An object of the invention is to provide an electrically heated cooking device which operates to subject the material being cooked to the desired temperature for a selected variable time, predetermined by the user.

Another object of the invention is to provide an electrically heated cooking device which operates automatically to maintain the flow of current in the heating element for a selected time after a predetermined temperature has been reached.

The invention possesses other objects and features of advantage, some of which, with the foregoing, will be set forth at length in the following description where I shall outline in full, that form of the invention which I have selected for illustration in the drawings accompanying and forming part of the present specification. In said drawings I have shown one embodiment of the device of my invention, but it is to be understood that I do not limit myself to such form, since the invention, as expressed in the claims, may be embodied in a plurality of forms. The device embodying my invention may be employed in connection with various forms and types of cooking utensils, and in the present instance I have shown it in connection with a coffee pot, since the invention lends itself particularly to the making of perfect coffee. While I have shown the device embodied in a cooking utensil, that is a coffee pot, it is to be understood that it may be embodied in a hot plate or disc upon which the cooking utensil is set.

Referring to said drawings:—

Figure 1 is a vertical section of a coffee pot embodying my invention.

Figure 4:
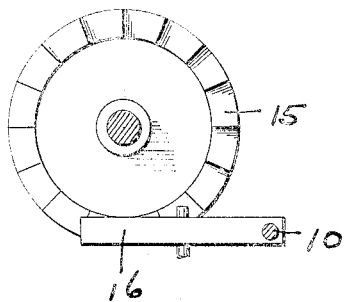
Fig. 4 is a section taken on the line 4—4, Fig. 1.
Figure 2:
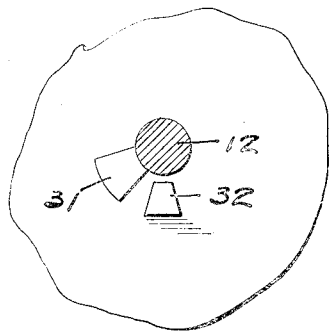
Fig. 2 is a cross section taken on the line 2—2, Fig. 1.
Figure 5:
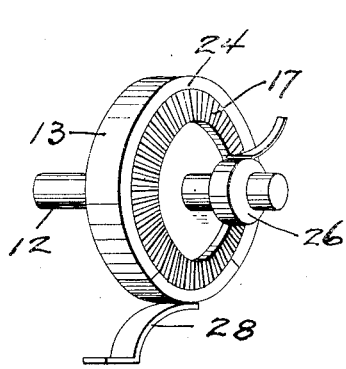
Fig. 5 is a perspective view of the rotary switch.
Figure 3:
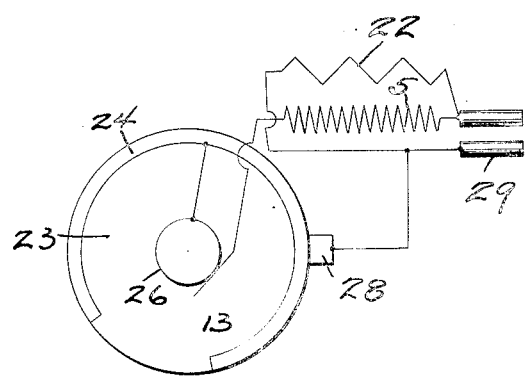
Fig. 3 is a diagrammatic representation of the electric circuits of the device.

The invention relates to an electric cooking device which operates to open the circuit of the heating element after the material being cooked has been subjected to a predetermined temperature for a selected length of time and comprises time controlled mechanism which is controlled by a temperature responsive device. The temperature responsive device is influenced by the temperature of the material being cooked, to release the time controlled device when a predetermined temperature is reached and the time controlled device operates to open the circuit after a selected time has elapsed. The time lag between the operation of the temperature responsive device and the opening of the circuit is variable at the will of the person using the device. For instance, in preparing coffee, the time controlled device may be set to produce a time lag of two minutes. With the temperature responsive device constructed to release the time controlled device at a predetermined temperature, for instance, 200° Fahrenheit, as soon as the water reaches this temperature, the time controlled mechanism is released and after a lapse of two minutes, during which time the coffee is brought to boiling and boiled for a short interval, the heating circuit is opened. The time controlled device may be set to produce any desired time interval within the range of the mechanism.

The present embodiment of the invention comprises a base 2 which is provided with an upper wall 3 which may form a cooking plate or which may form the bottom of the coffee pot 4. Arranged below and in thermal contact with the wall 3, is an electric heating element 5. Disposed in thermal contact with the wall 3 or with the material in the pot or receptacle 4 is a thermal responsive device 6, comprising a pressure cell having flexible walls, the distance between which is varied by differences in pressure in the cell. The cell is preferably disposed in a pocket formed at the center of the wall 3, one wall of the cell being attached to the wall 3 and the other wall 7 of the cell being free to move. Attached to the free wall 7 of the cell is a rod 8 which is moved in accordance with variations in temperature, and which is arranged in co-operative relation with the time controlled mechanism.

Arranged within the base 2 and suitably mounted for rotation therein, is a shaft 12 carrying a rotatable switch 13 for opening and closing the electric circuit. The shaft is connected to and rotatable with a clock mechanism 14 disposed in the base, the action of which mechanism is controlled by the thermal responsive device. Associated with and connected to the clock mechanism in such manner that it is rotatable concurrently with the shaft 12 is a ratchet wheel 15 adapted to be engaged by and held against rotation by a latch 16. The latch 16 is associated with the rod 8 in such manner that when the thermal responsive device reaches a given temperature, the latch is raised from the ratchet wheel 15, thus releasing the clock mechanism, which then operates to rotate the rotatable switch 13. A set screw 10 carried by the latch 16 provides means for setting the device to release the clock mechanism at the selected predetermined temperature. The shaft 12 carrying the switch 13 is preferably provided with a beveled gear 17 meshing with a bevel gear 18 secured to one of the slowly rotating gears of the clock mechanism, and preferably a clock mechanism gear with which the clock main spring 21 is directly associated, so that the spring may readily drive the rotatable switch when the clock mechanism is released.

The rotatable switch is so constructed, that when it is in its normal position, the circuit through the heating element 5 is open, and when it is moved from normal position to set position, the circuit is closed and remains closed until the switch again returns to normal position. In the present construction I have employed an auxiliary heating element 22 in thermal communication with the material to be cooked, which is so designed that the heat generated therein is sufficient only to keep the material warm after it has been cooked. The circuit through the auxiliary heating element is closed so that current flows therein when the cooking device is connected to the service outlet. It is to be understood however, that the invention is not limited to the use of this auxiliary heating element and that it can be dispensed with when desired.

The rotary switch comprises a disc 23, preferably of fiber or other insulating material, provided on its periphery with a contact segment 24, connected to an insulated collector ring 26 mounted on the shaft 12. The segment 24, is connected to the main heating element through the collector ring 26, and extends around the disc for the major portion of its periphery, the gap between the ends of the segment being filled with the insulating material of the disc. Engaging the periphery of the disc is a brush 28 which is connected to one contact post 29 arranged in the base and the main heating element 5 is connected to the other contact post. The disc is normally held in position with the brush 28 in contact with the insulating segment of the switch by a projection 31 on the shaft 12 engaging a fixed stop 32 on the base. These stops also prohibit the shaft from being rotated by hand in the wrong direction and limit the proper rotation of the shaft to less than one revolution. The rotary switch is rotated to the desired position to produce the desired time lag by a handle 33 secured to the shaft 12 and disposed on the outside of the base. The exterior surface of the base is provided with a scale, divided into minutes, arranged contiguous to the handle, so that the person using the device may readily and easily set it for the desired time lag. When the handle is turned, the rotatable switch and the ratchet wheel 15 are simultaneously turned to adjusted position, the current flows through the main heating element. When the desired temperature is reached, the temperature responsive device trips the latch freeing the clock mechanism, which slowly turns the switch back to normal position, the time required to reach such position depending upon the setting of the time mechanism.

When the device is employed with a coffee pot, there is provided a container 34 for the ground coffee. This container is preferably cylindrical in shape and is formed of screen or other foraminous material to permit ready circulation of the water through the ground coffee. The container is provided on its side wall with a scale 35 indicating the amount of ground coffee to be used for the required number of cups of the beverage to be made and is also provided with a perforated top closure 36 which rests on the coffee to prevent it from passing into the pot. When the indicated amount of ground coffee is placed in the container, the proper number of cups of water added and the handle set to provide the proper time lag, perfect coffee is the result.

I claim:

1. A cooker comprising means for heating the material to be cooked and means for turning off the heat at the end of a selected predetermined period of time after the material reaches a predetermined temperature.

2. A cooker comprising means for heating the material to be cooked, time controlled means for turning off the heat and a thermal responsive device in thermal contact with the material arranged to control the operation of said time controlled means.

3. A cooker comprising a heating element disposed in thermal contact with the material to be cooked, an electric circuit in which said element is connected, time controlled means for opening said circuit and a thermal responsive device in thermal contact with said material arranged to release said time controlled means.

4. A cooker comprising a heating element disposed in thermal contact with the material to be cooked, an electric circuit in which said element is connected and means for opening said circuit at a predetermined variable time after the material reaches a predetermined temperature.

5. A cooker comprising an electric heating element in thermal contact with the material to be cooked, time controlled means for turning off the supply of current to said element, means for holding said time controlled means inoperative and a thermal responsive device in thermal contact with said material arranged to release said holding means when the material reaches a predetermined temperature.

6. A cooker comprising an electric heating element in thermal contact with the material to be cooked, a switch in the circuit of said element, means for holding said switch in the closed position, a thermal responsive device in thermal contact with the material arranged to release said holding means when the material reaches a predetermined temperature and means for keeping the switch closed for a selected time after said holding means is released.

7. A cooker comprising an electric heating element in thermal contact with the material to be cooked, a rotatable switch in the circuit of said element, means for controlling the rate of rotation of said switch, means for initially rotating said switch from an initial position to a selected position, means for holding said switch in the selected position and means controlled by the temperature of the material being cooked for releasing said holding means.

8. A cooker comprising an electric heating element in thermal contact with the material to be cooked, a rotatable switch in the circuit of said element, a handle for rotating said switch from an initial position in which the circuit through the element is open to a variable selected position in which the circuit is closed, means tending to slowly rotate said switch from the selected position to its initial position, means for preventing said slow rotation of the switch and means operative by a predetermined temperature of the material for releasing said preventing means.

9. A cooker comprising an electric heating element in thermal contact with the material to be cooked, a switch in the circuit of said element, time controlled means tending to open said switch, a handle for setting said time controlled means to cause a selected variable time to elapse between the release of the time controlled means and the opening of the switch, means for holding said time controlled means against actuation of the switch and means operative by a predetermined temperature of the material for releasing said holding means.

10. A cooker comprising a main electric heating element and an auxiliary electric heating element, both in thermal contact with the material to be cooked, a switch adapted in its initial position to open the circuit through the main element and in set position to close the circuit through the main element, means for moving the switch from its initial position to a variable set position, time controlled means tending to return the switch from set position to initial position, means for holding said switch against said return movement and temperature controlled means for releasing said holding means.

11. A cooker comprising means for heating the material to be cooked, time controlled mechanism for turning off the heat and a thermal responsive device for setting said mechanism into operation.

12. A cooker comprising means for heating the material to be cooked, time controlled mechanism for turning off the heat and a thermal responsive device for setting said mechanism into operation at a predetermined temperature.

In testimony whereof, I have hereunto set my hand.

JOHN F. NEWSOM.